US007166020B2

(12) United States Patent
Van De Wal

(10) Patent No.: US 7,166,020 B2
(45) Date of Patent: Jan. 23, 2007

(54) METHOD AND APPARATUS FOR TRANSPORTING SAUSAGE TO A TREATMENT ROOM

(75) Inventor: Hendrik Van De Wal, Barneveld (NL)

(73) Assignee: Van De Wal Metaalbewerking B.V., Ma Barneveld (NL)

( * ) Notice: Subject to any disclaimer, the term of this patent is extended or adjusted under 35 U.S.C. 154(b) by 0 days.

(21) Appl. No.: 10/499,012

(22) PCT Filed: Dec. 19, 2002

(86) PCT No.: PCT/NL02/00851

§ 371 (c)(1),
(2), (4) Date: Nov. 29, 2004

(87) PCT Pub. No.: WO03/051129

PCT Pub. Date: Jun. 26, 2003

(65) Prior Publication Data

US 2005/0101241 A1    May 12, 2005

(30) Foreign Application Priority Data

Dec. 19, 2001 (NL) .................................. 1019614
Apr. 29, 2002 (NL) .................................. 1020499

(51) Int. Cl.
*A22C 11/00* (2006.01)
(52) U.S. Cl. ........................................... 452/32
(58) Field of Classification Search .................. None
See application file for complete search history.

(56) References Cited

U.S. PATENT DOCUMENTS

| 3,857,330 | A | * | 12/1974 | Ruckstaetter | ................. | 99/354 |
| 4,999,973 | A | * | 3/1991 | O'Brien | ........................ | 53/411 |
| 5,057,055 | A | * | 10/1991 | Michaud et al. | ............... | 452/51 |
| 5,100,364 | A | | 3/1992 | Kollross et al. | | |
| 5,355,778 | A | * | 10/1994 | Mayfield et al. | ............... | 99/441 |
| 5,382,190 | A | * | 1/1995 | Graves | ......................... | 452/21 |
| 5,628,244 | A | * | 5/1997 | Holliday | .................... | 99/421 A |
| 5,634,317 | A | * | 6/1997 | Bylenga | ....................... | 53/170 |
| 5,709,068 | A | * | 1/1998 | Bylenga | ....................... | 53/449 |

FOREIGN PATENT DOCUMENTS

| EP | 0 093 037 A | 11/1983 |
| WO | WO 92/03929 A | 3/1992 |
| WO | WO 01/97622 A | 12/2001 |

\* cited by examiner

*Primary Examiner*—Thomas Price
(74) *Attorney, Agent, or Firm*—Harness, Dickey & Pierce, P.L.C.

(57) ABSTRACT

A method is for transporting one or more sausages provided with a suspension member into a treatment room. The sausages are placed in a holder in a desired position. A number of holders with the sausages therein are disposed adjacently of each other in the desired position, so that a stick or tube can be inserted through the holders in order to allow the sausages to be transported to the treatment room and to remain there adjacently of each other.

10 Claims, 10 Drawing Sheets

METHOD AND APPARATUS FOR TRANSPORTING SAUSAGE TO A TREATMENT ROOM

In large parts of Europe as well as outside Europe, so-called smoked sausages are produced and consumed in large numbers. The production thereof is usually highly automated. Examples hereof are described in the international patent application PCT/NL91/00154, American U.S. Pat. No. 5,100,364 and European patent applications EP-A-0 048 507 and EP-A-0 498 127.

Such a production for instance takes place at a speed in the order of magnitude of 50 sausages per minute. The sausages are then suspended in a smoke room for 24 hours for instance in numbers of 100 sticks, each with 15 to 17 sausages on a piece of string.

In current practice the suspending of sausages from a stick in a smoke room takes place manually. Proposals to also automate the suspension of sausages on the string have not yet resulted in a practical solution.

The present invention provides a method for transporting sausages provided with a suspension member into a treatment room, wherein the sausages are placed in a holder in a desired position, and wherein a predetermined number of holders with the sausages therein are disposed adjacently of each other in the desired position, so that a stick or tube can be inserted through the holders in order to allow the sausages to be transported to the treatment room and to remain there adjacently of each other.

The present invention further provides an apparatus for transporting one or more sausages provided with a suspension member into a treatment room, comprising a holder for receiving a sausage, and one or more conveyors for transporting filled respectively emptied cassettes from and to a supply of the sausages.

An inexpensive and elegant embodiment results if use is made of a feed conveyor for feeding cassettes filled with sausage to a part of the discharge cassettes where a stick or tube can be placed through the opening in cassettes and the sausages can be lifted out of the cassettes.

In a preferred embodiment the apparatus comprises sausage decentring means for holding the sausage out of the centre of the holder. Some types of sausage, such as less firm sausages or sausages with for instance a natural intestine, can collapse in the holder, whereby they come to lie at the position of the opening of the cassettes through which the stick or tube is inserted. The sausage may for instance be damaged hereby or the normal operation of the apparatus may be obstructed. The sausage decentring means prevent this by holding the sausage out of centre or outside the opening location of the cassette.

In a further embodiment the decentring means comprise suction means for placing substantially on the top part of the holder. One solution is that the sausages are held fast by means of suction means, such as for instance suction cups, thereby preventing collapse of the sausage.

In another embodiment the holder comprises suction channels in the sides of the holder for drawing the sausage to the side of the holder. This embodiment of suction means also provides that the openings of the cassettes are each efficiently kept clear of blocking parts of the sausage during insertion of the stick or tube through the opening of the cassettes.

The apparatus preferably further comprises pumping means for applying suction force in the suction means or suction channels. The suction cups can also be energized hereby.

In a further embodiment the apparatus comprises drive means for rotating the stick or tube. Through rotation of the tube sausages are positioned over the tube such that they come to be suspended on the tube with the suspension member upward.

In order to improve this process the drive means comprise means for varying the rotation speed of the stick or tube. This preferably takes place by means of eccentrically driven drive wheels. Such a drive with variations in the rotation speed has the advantage that the sausages hanging at any given moment over the tube with parts of the sausage are driven in jolting manner, whereby the rotation of the sausage round the tube or stick proceeds better.

In a further preferred embodiment the apparatus and method are provided with holding means, preferably in the form of a hingedly arranged ratchet, for holding a string of the sausage relative to a rod, preferably provided with diabolos, in order to hold the sausage in the correct position via the string.

Holder detection means such as an electronic eye are arranged so as to detect the desired position, i.e. to detect the position of the string, whereafter the sausage has to remain in this desired position.

In the more rudimentary preferred embodiment, an apparatus according to the present invention comprises supply means for the sticks; cassettes provided with slots, while the sticks are moved upward, optionally in mechanical manner, after placing through the cassettes, and are discharged to a smoke room.

Further advantages, features and details of the present invention will be elucidated on the basis of the following description of a preferred embodiment thereof, with reference to the annexed figures, in which.

Figure 1:
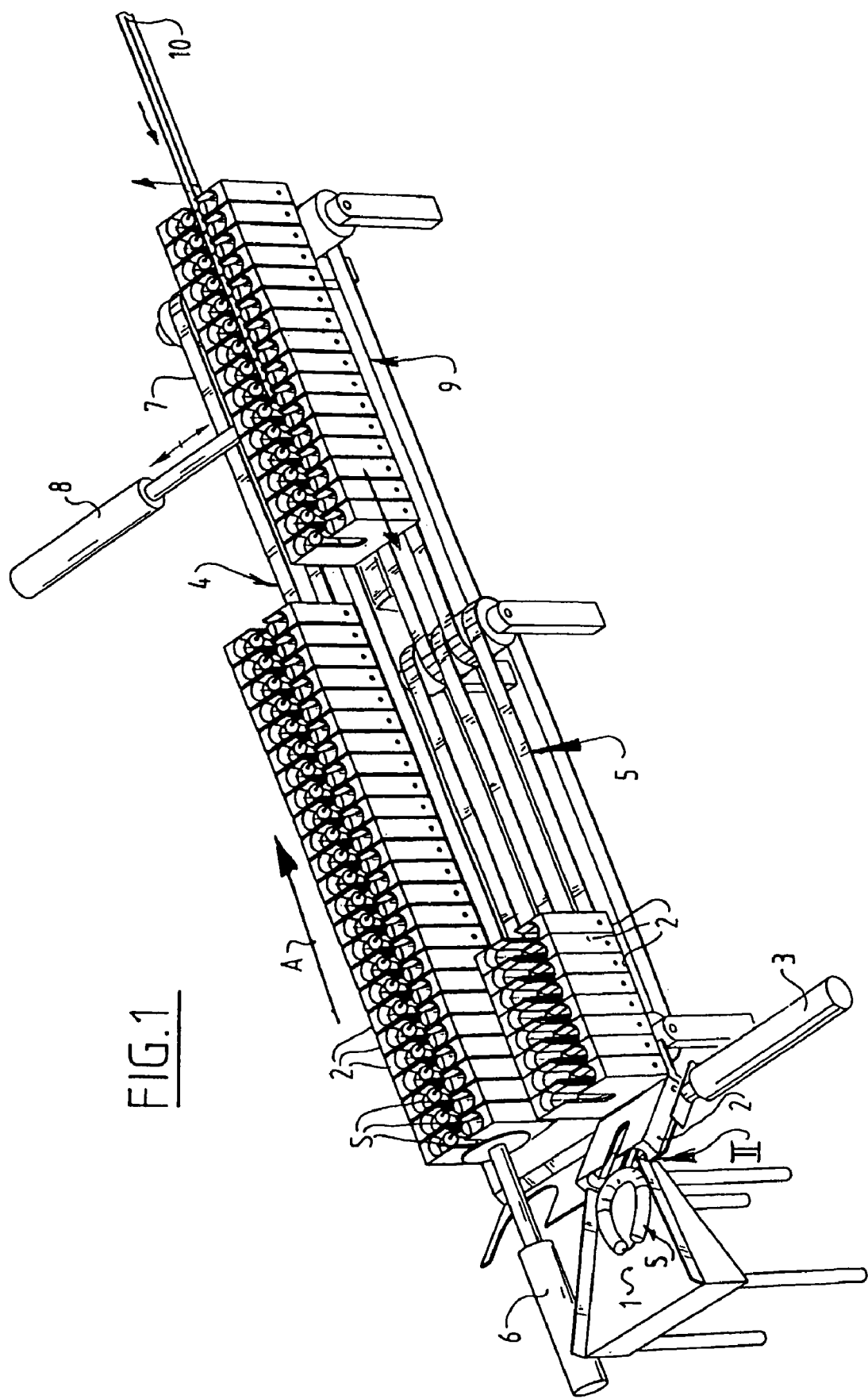
FIG. 1 shows a schematic top view in perspective of a first preferred embodiment of an apparatus according to the present invention for performing a preferred embodiment of a method according to the present invention.

An in many cases mechanically produced (smoked) sausage S is carried into a cassette 2 via a narrowing slide chute 1, whereafter the cassette 2 is displaced laterally by pusher member 3 to a conveyor device 4, which is disposed adjacently of a conveyor device 5 where cassettes 2 for filling are supplied. Cassettes 2 filled with sausages S are transported in the direction of arrow A, for instance using second pusher member 6 and belts 7 of conveyor 4. After a predetermined number of cassettes, for instance about twenty, filled with sausages have accumulated close to an end of conveyor 4, this predetermined number is pushed using a third pusher member 8 to a conveyor part 9, where a stick or rod 10 is inserted through the opening in the cassettes and moved upward in order to lift the smoked sausages simultaneously out of their associated cassettes in automatic manner and displace them to a smoke room. Using conveyor 5 the emptied cassettes are then subsequently carried to a position close to pusher member 3, where the above described cycle can be repeated.

Figure 2A:
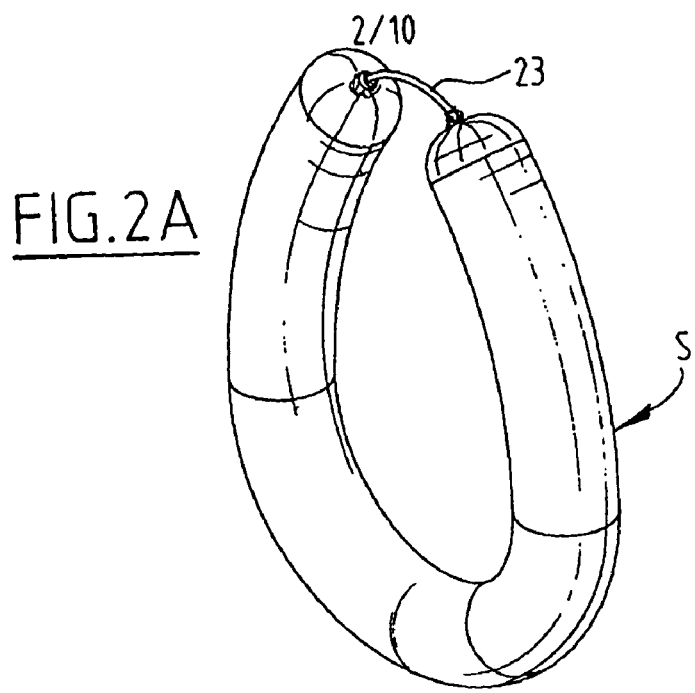
FIG. 2A and FIG. 2B show a perspective view of detail II of FIG. 1.
Figure 2B:
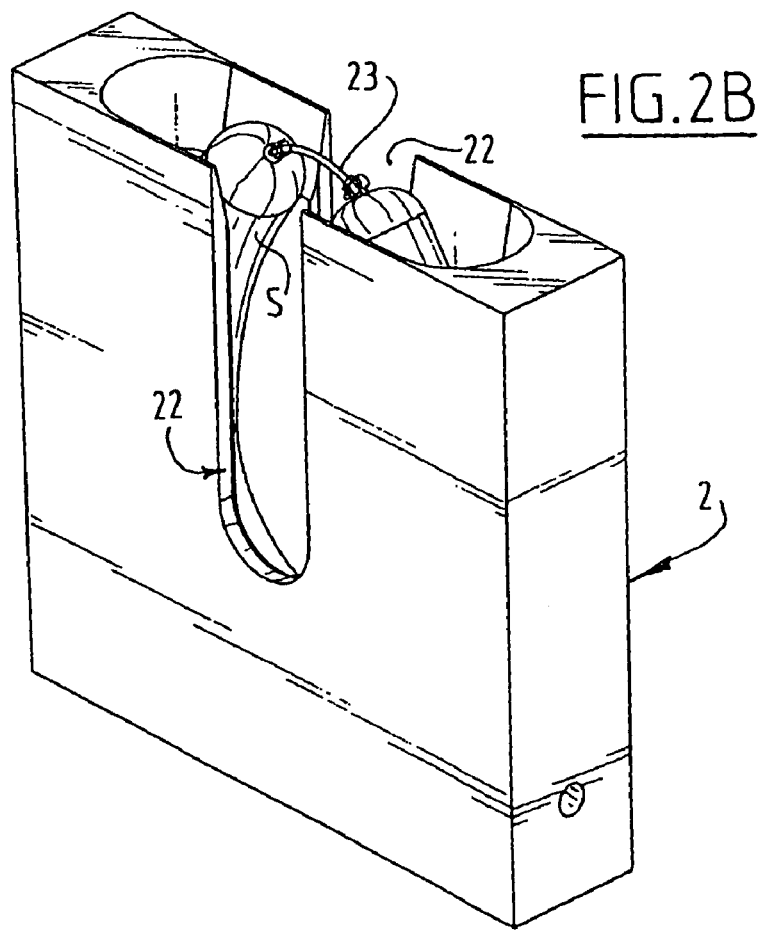

As can be seen in FIGS. 2A and 2B, cassette 2 is formed and provided on both sides with slotted recesses 22 such that a stick or tube 10 can easily be inserted therein beneath a piece of string or cord 23. Even if sausage S has come to lie slightly askew in the cassette, some movement of the stick back and forth relative to the cassettes will enable the sausage to be lifted easily from the cassette.

In the preferred embodiment drawn in FIG. 1 the cassette directed toward the slide chute is clamped and moved sideways by a pusher member. As soon as the cassette is filled with a sausage, it is placed by a second pusher member 6 on a conveyor 4, which can for instance run continuously. In a manner not shown the predetermined number of cassettes can be counted using a counting means (not shown), and as soon as the number has been reached, be transferred by a pusher member 8 to a part 9 which can be driven independently of the other part of conveyor belt 5.

Figure 3:
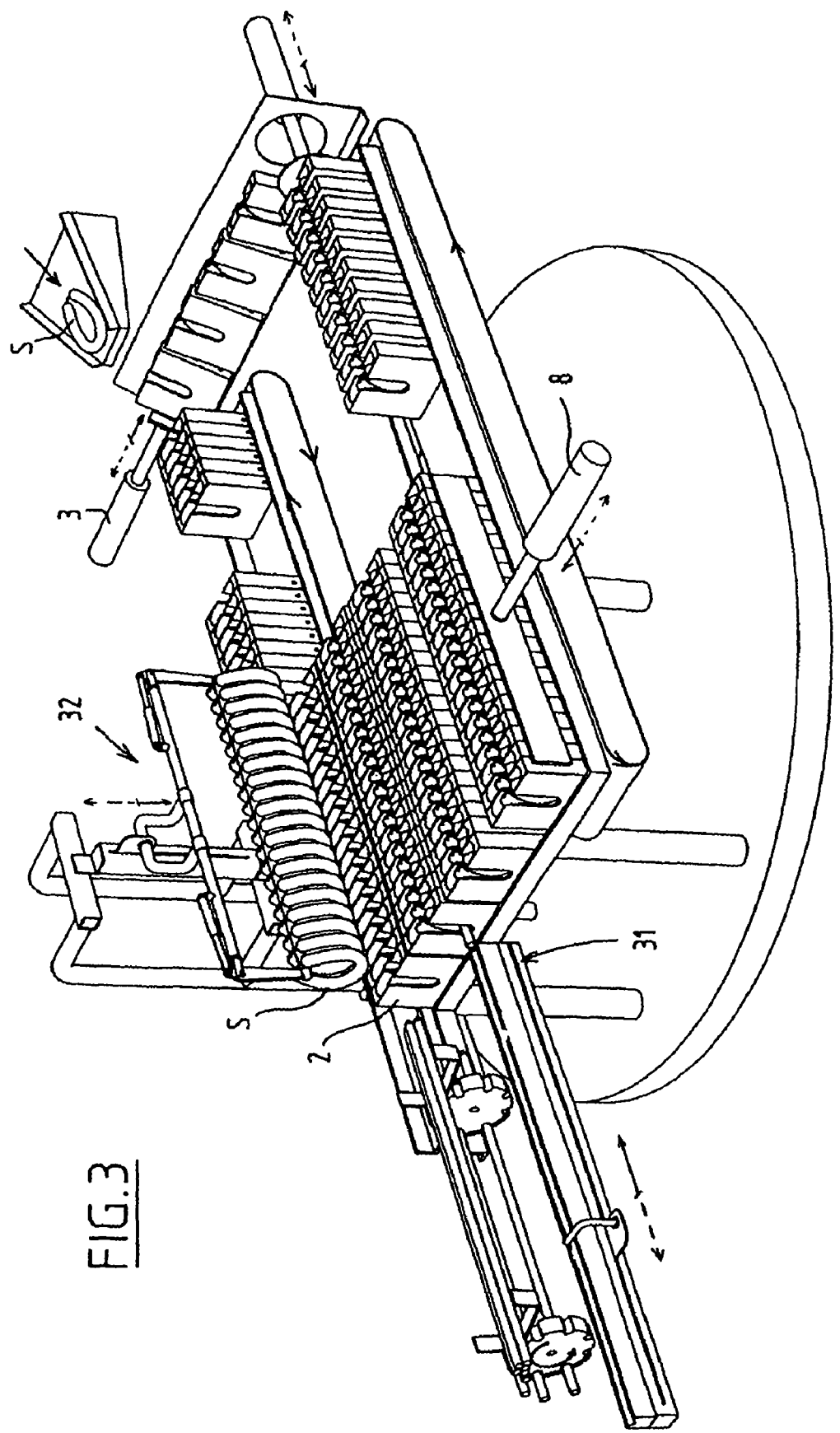
FIG. 3 shows a partly schematic view in perspective of a further preferred embodiment and apparatus according to the present invention.
Figure 4:
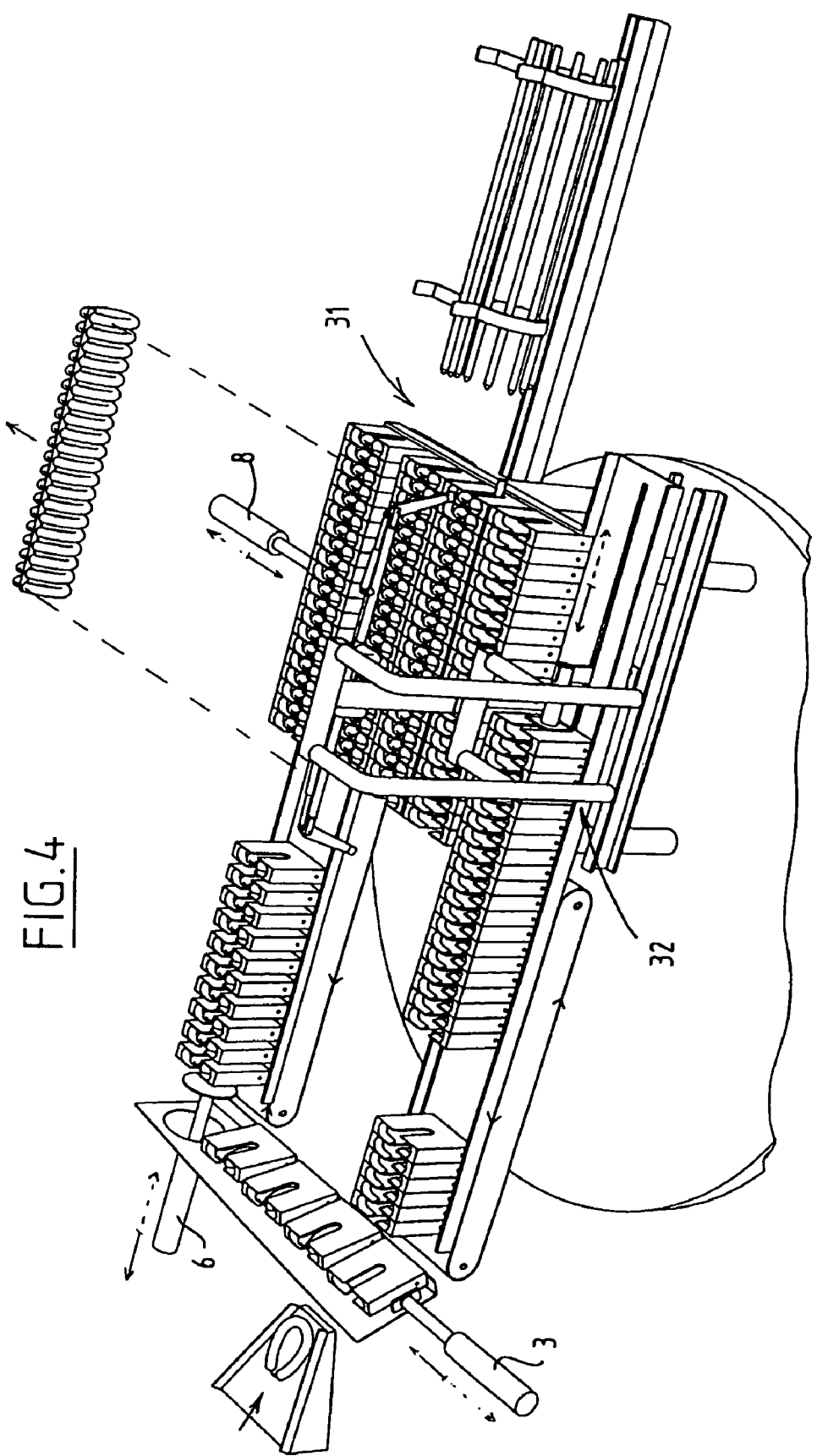
FIG. 4 shows a perspective view of the embodiment of FIG. 3.

In the further developed preferred embodiment according to FIGS. 3 and 4, the diverse similar components are provided with the same reference numerals as said preferred embodiment according to FIGS. 1 and 2. In a stick supply station 31 a stick is inserted through the recesses in the cassettes, and the sausages are subsequently lifted out of the cassettes and rotated in one (or two) direction(s) by lifting device 32 in order to ensure a correct positioning of the sausages.

In a further preferred embodiment (not shown) an additional stick supply station can be placed preceding the stick supply station 31 and between the conveyor with filled cassettes and this stick supply station, wherein diabolo-shaped protrusions are arranged on the stick at each position of a cassette in order to lift the sausages slightly out of the cassettes and to cause the sausages to hang on the strings by rotating the stick with the diabolos thereon. Thus is ensured that the sausages come to lie as straight as possible in the cassettes, i.e. with the string at the top. For coarse sausages the diabolos can be provided with recesses to prevent friction occurring between sausage and stick when this latter is rotated. The sticks from the subsequent stick supply station can also be made rotatable for the same purpose.

Figure 5:
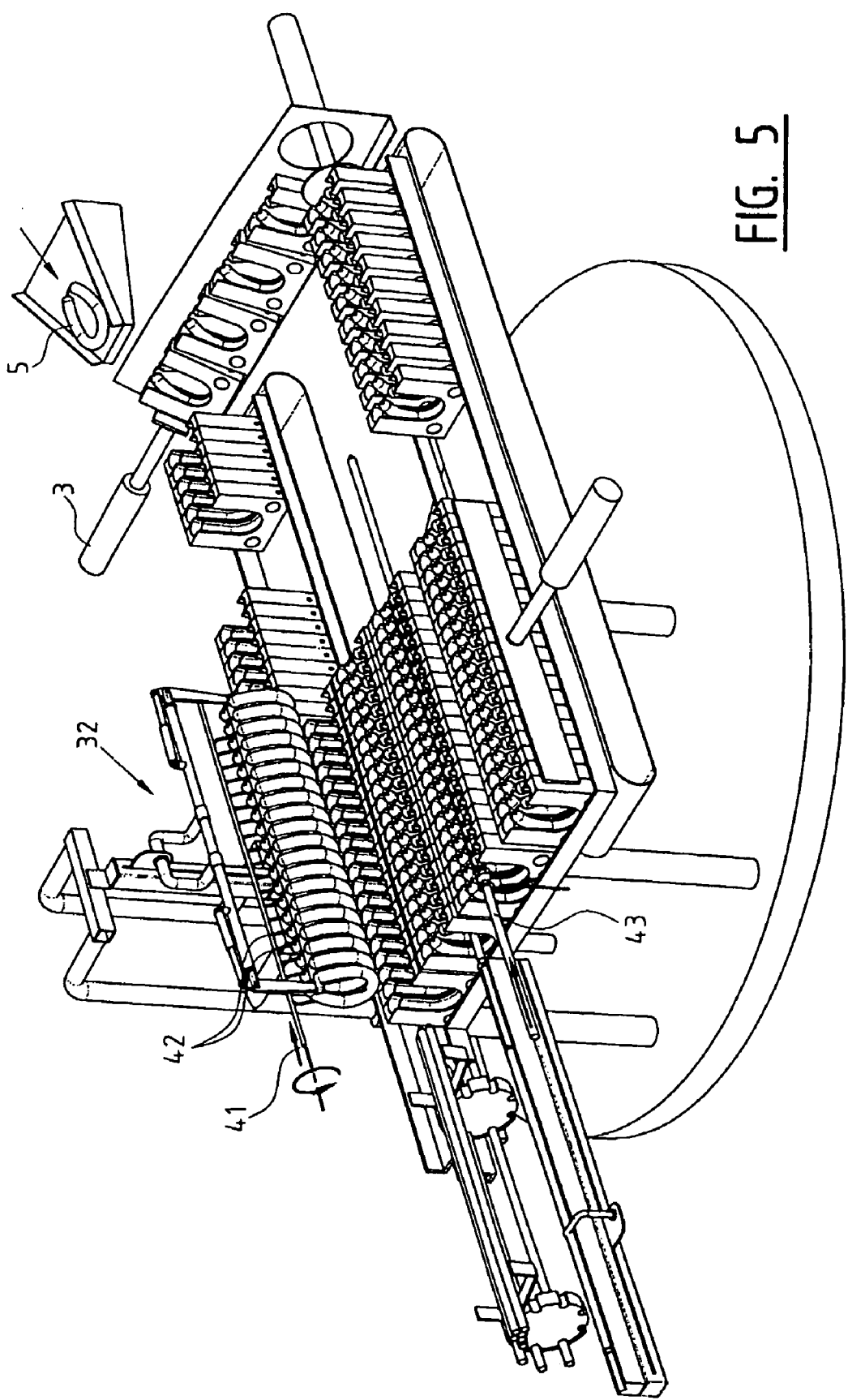
FIG. 5 is a partly schematic view in perspective of a further embodiment and apparatus according to the present invention.

FIG. 5 shows a preferred embodiment which corresponds by and large with the preferred embodiment of FIG. 3, wherein the reference numerals of similar components are the same. The diabolos already mentioned above are arranged on shaft 43. A shaft 41 provided with pins 42, together forming a so-called comb, is further provided on lifting device 32 for positioning the sausages at regular distances.

Figure 6:
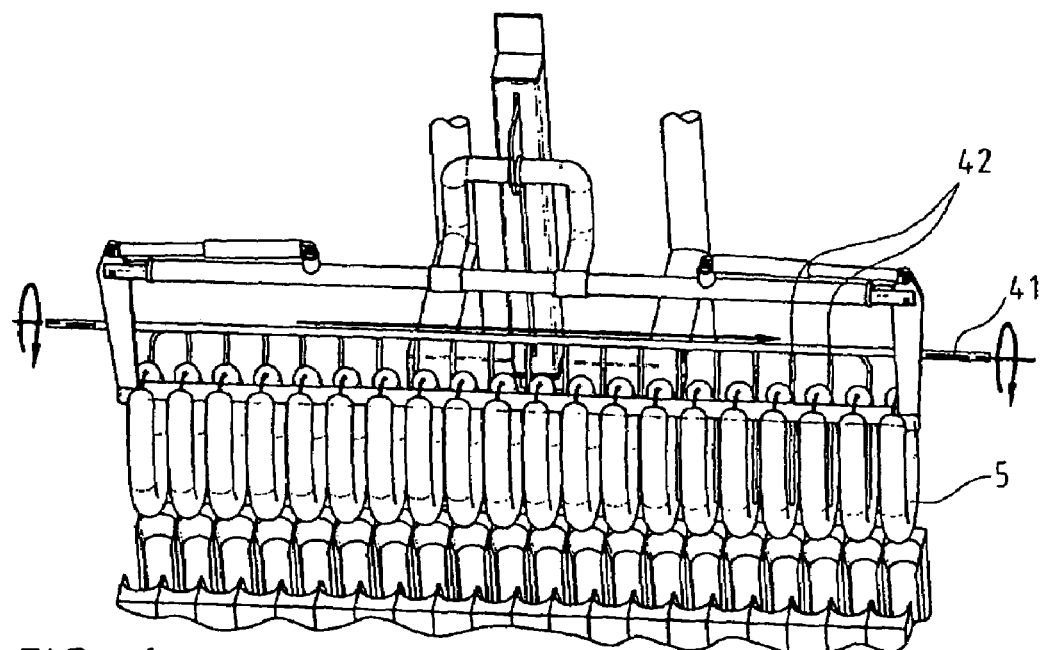
FIG. 6 is a perspective view of a detail of the embodiment of FIG. 5.

Lifting device 32 is shown in detail in FIG. 6. This shows the shaft 41 with pins 42. The sausages which have been lifted out of holders 2 by means of shaft 41 are not necessarily hanging positioned precisely at the same distance relative to each other. In order to achieve such a correct positioning, shaft 41 is rotated as according to the arrow in a manner such that teeth 42 are placed between strings 44 of the sausages. Shaft 41 is then moved so far that each string comes to a stop against a tooth, whereby all the strings are positioned at equal distances along shaft 41 through being held in place by teeth 42. The sausages are hereby suspended in very regular manner from shaft 41. It is also conceivable that, instead of being rotated, shaft 41 is displaced perpendicularly of its central axis in order to place the teeth 42 between the strings.

Figure 7:
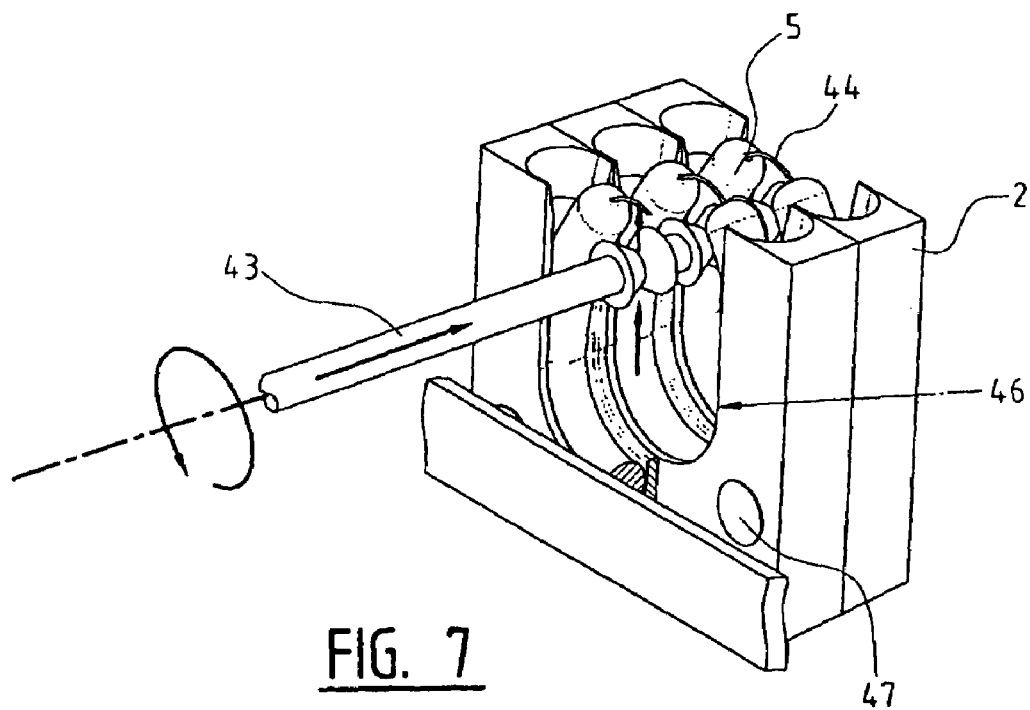
FIG. 7 is a perspective view of a further detail of the embodiment of FIG. 5.

FIG. 7 shows a further preferred embodiment of shaft 43 with the diabolos. In this figure the holders 2 are situated at a position in the apparatus of FIG. 5 such that shaft 43 with diabolos 49 can be inserted through the holder and the sausage in a manner such that the diabolos can engage in the respective sausages. One purpose hereof is that, since the sausages are placed at random in the holders and it is essential that strings 44 are situated at the top, the sausages can be turned using the diabolos. If after placing of the sausage in the holder, the string is situated on the underside of the holder, the sausage must be turned. For this purpose the shaft 43 is inserted through a predetermined number of, for instance 20, holders and sausages and then lifted upward. If shaft 43 with diabolos 49 now begins to rotate, the sausage will co-rotate due to friction forces between the diabolo and the sausage until the string reaches the diabolo. At that moment the very much smaller friction force between the string and the diabolo, together with the force of gravity on the sausage, will bring to an end the rotation of the sausage, and the sausage will remain suspended over shaft 43 in the correct position. Shaft 43 is moved slightly downward and moved out of the array of holders. In this embodiment the openings of the holders take a slightly round form whereby opening 46 cannot form an obstruction to the moving in and out of shaft 43 with the diabolos.

It is recommended to embody a number of, for instance 20, holders integrally. This is possible according to the above described embodiments by means of for instance magnets 47 for snapping separate holders together. It is however also recommended to use large holders with 20 compartments, which have the same function as 20 separate holders snapped together.

Figure 8:
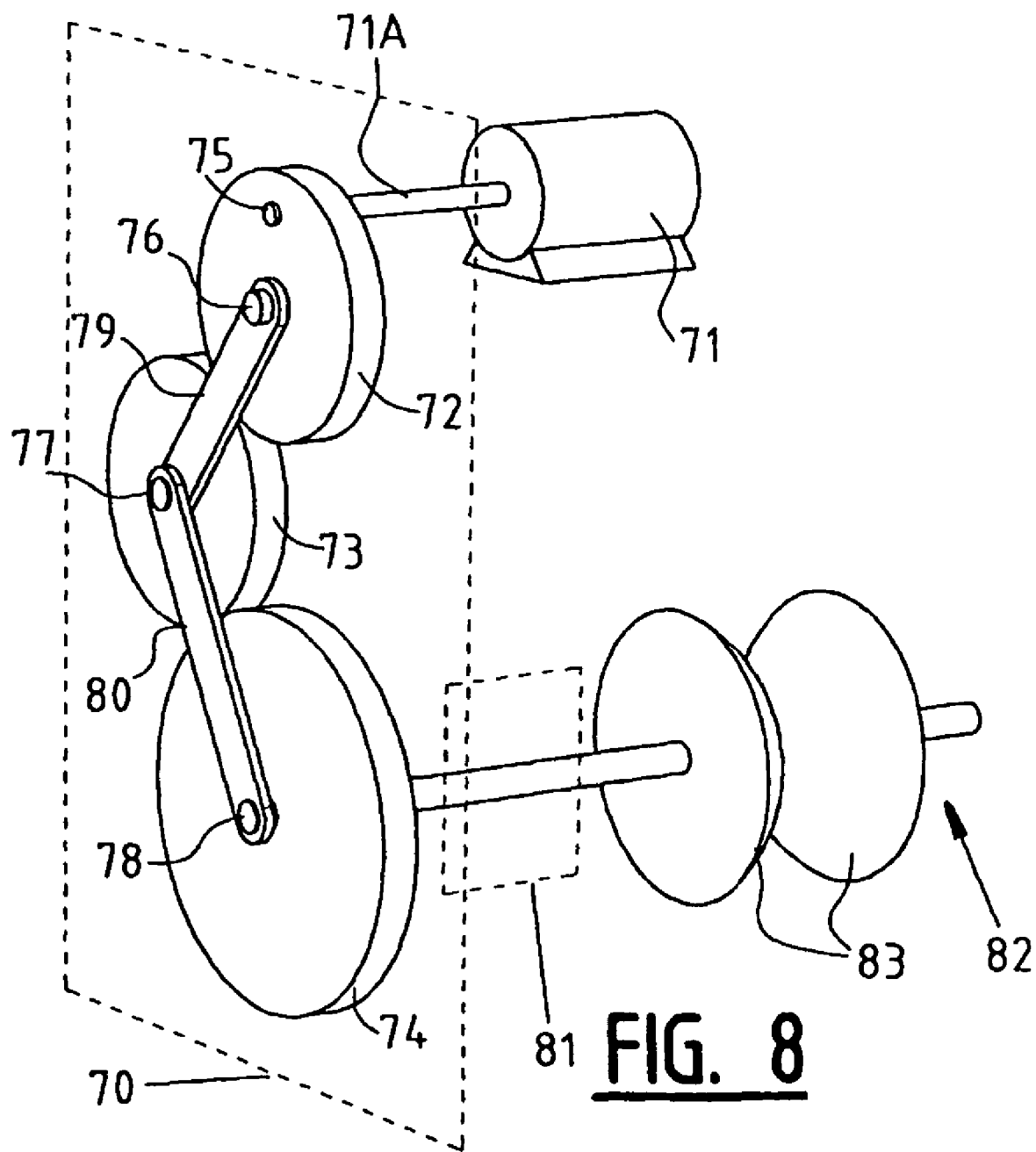
FIG. 8 is a perspective view of a further embodiment according to the present invention.

In this embodiment the drive of the rotating stick 82 (FIG. 8) takes a variable form. For this purpose a drive motor 71 is connected eccentrically to toothed wheel 72 at the position of hole 75. Toothed wheels 72,73 and 74 are mounted on supports 79 and 80 which are movable relative to each other. Toothed wheel 72 drives toothed wheel 73 and toothed wheel 73 drives toothed wheel 74. Because toothed wheel 72 is driven eccentrically, toothed wheel 73 will be driven with variable speed by toothed wheel 72, whereby toothed wheel 74 likewise acquires a variable speed if drive motor 71 drives at a constant rotation speed. This is achieved in that the part of toothed wheel 72 on the side of eccentric drive point 75 uses a smaller number of toothed wheel teeth per unit of time compared to toothed wheel 73 for the purpose of driving toothed wheel 73. By means of a transmission 81 (not further shown) the shaft 78 passing through toothed wheel 74 drives the tube 82 for holding up the sausages. Further shown on this tube 82 is a diabolo 83, which diabolos are used to position sausages as described above.

Figure 9A:
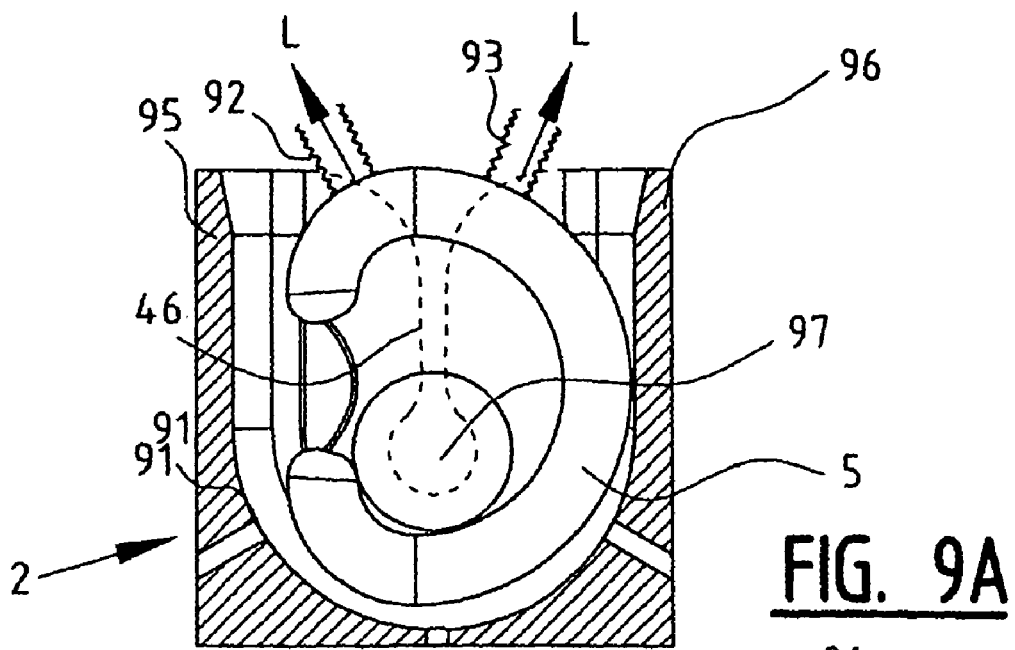
FIG. 9A and FIG. 9B are front views of a detail of a further embodiment according to the present invention in two positions.
Figure 9B:
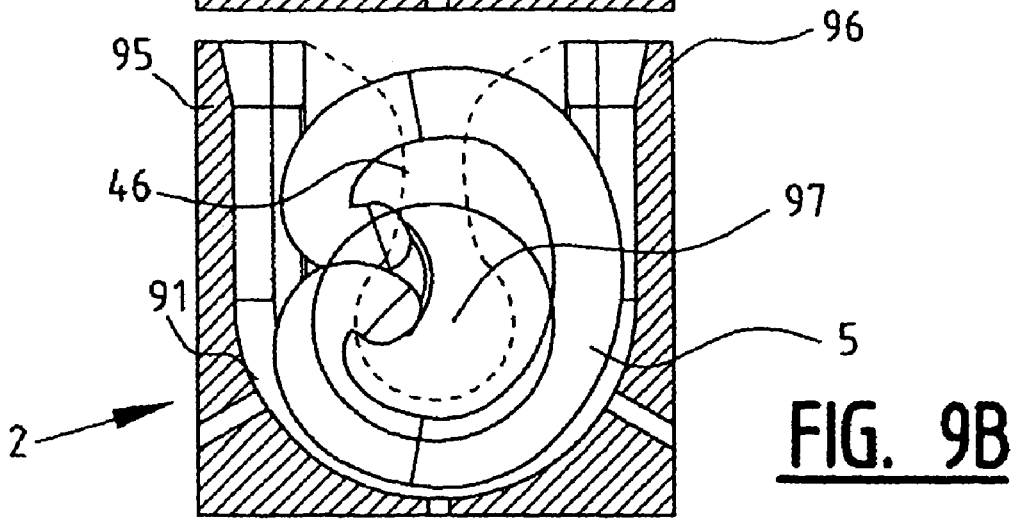
Figure 10:
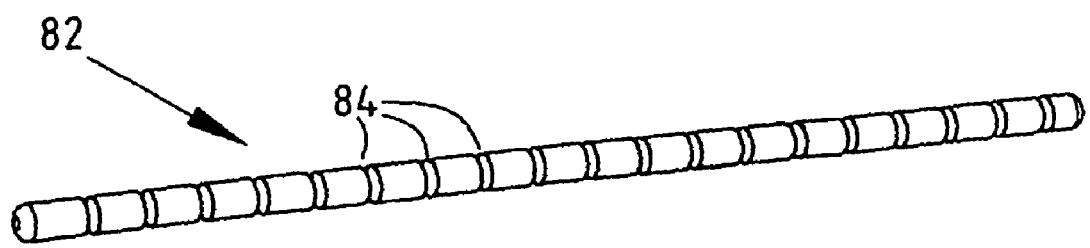
FIG. 10 is a view of a detail of a further embodiment according to the present invention.

FIG. 9 shows a cross-section of a holder 2 having therein a sausage S. Clearly shown is that a sausage can block the passage (9B). In order to prevent this, this embodiment is provided with suction cups 92, 93 which are provided with air suction hoses through which air L is drawn off. Opening 0 is hereby open. Contour 91 shows the side walls of the inside of the holder in which the sausage is located. Contour 46 shows the form of the side walls of the holder as this is also shown in FIG. 7. In this embodiment however, the opening is rather more round and the vertical opening of the side walls is wide such that a tube can still just be moved upward therethrough to pick up the sausage from the holder.

In a further embodiment (not shown) the side walls 95,96 of the holder are provided with air channels which can draw a sausage in sideward direction, whereby the sausage will not block the opening. Such an embodiment has the advantage that the decentring means or suction means do not have to be positioned after placing of the sausage.

In a further embodiment (FIG. 9) the tubes for holding the sausage, on which the sausage will be placed in the smoke room, are provided with slots such that if the sausage hangs with the strings on the stick and these are optionally positioned by means of pins 42 (FIG. 5), as described in the foregoing, such that the strings have entered the slots, the sausages will not shift easily when the tubes are displaced from the sausage suspension device to the smoke room. This the advantage for instance that displacement of the tubes becomes simpler and that this displacement does not have to be performed in exaggeratedly cautious manner.

Figure 11:
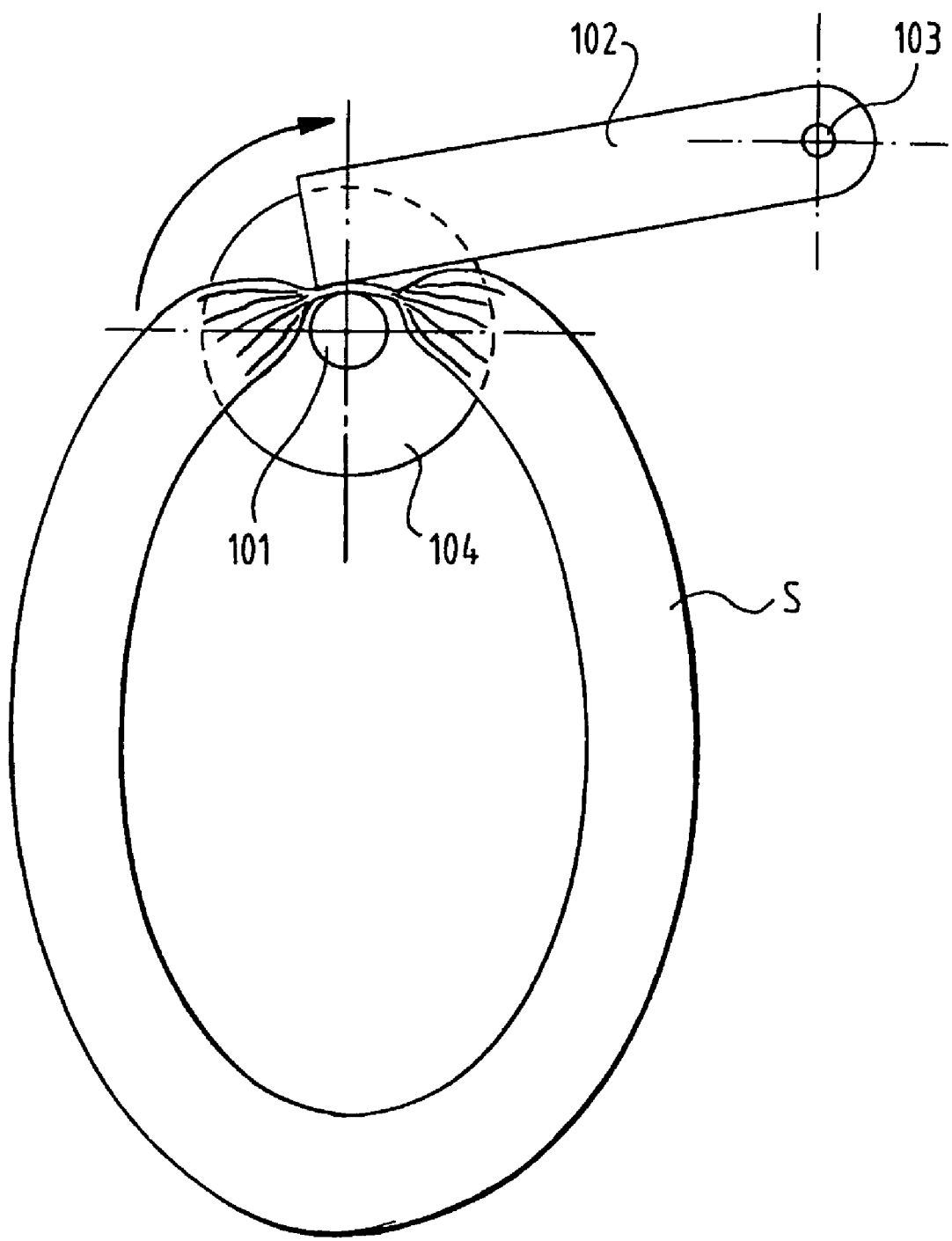
FIG. 11 is a view of a detail of a further preferred embodiment of an apparatus and method according to the present invention.

In a further embodiment a sausage S (FIG. 11) is held in place on an axis 101 by a ratchet 102 which is arranged hingedly on a transverse axis 103 and which due to its own weight falls between two diabolo members 104.

Tests have shown that the combinations of ratchets and diabolos operate very well, i.e. it was possible with the newest embodiment to operate for a long time without disruption, wherein less than a minute was required to obtain a stick with sausages. The machine also operated without problem for loosely filled sausages; with a correct adjustment of the ratchet all sausages were hung straight.

Figure 12:
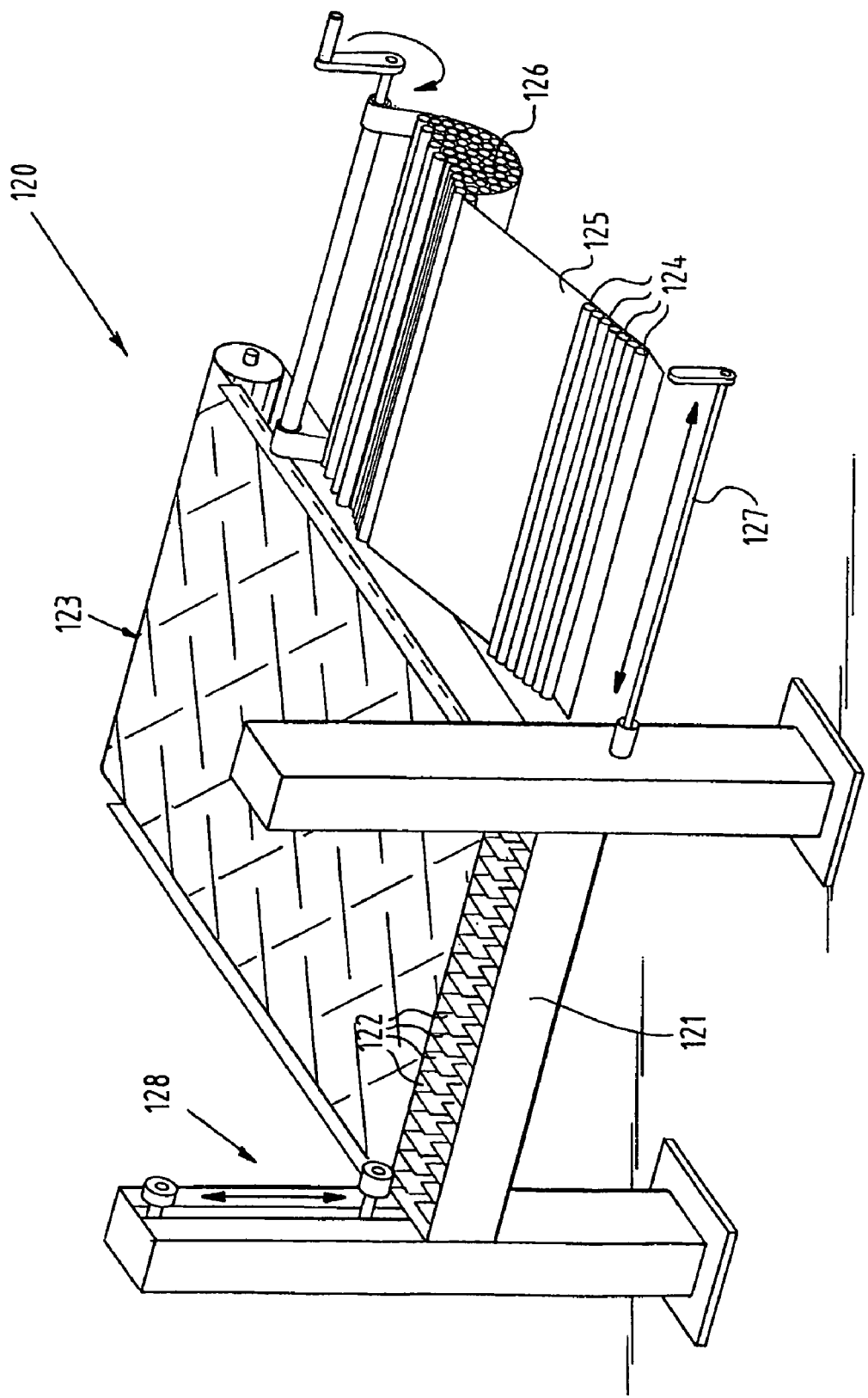
FIG. 12 is a view of a further preferred embodiment of the apparatus and method according to the present invention.

In a further preferred embodiment of an apparatus 120 (FIG. 12) according to the present invention, a cassette 121 with a number of holders 122, for instance twenty, each provided with a slot, is supplied via a conveyor 123, while sticks 124 are supplied via an incline 125 from a supply 126. Using an infeed mechanism 127 the sticks are placed through the slots in the cassette, while using a combined lift-clamp mechanism 128 the sticks are clamped fixedly and then moved upward, whereafter the sticks filled with sau sages can be discharged to the smoke room, in the present case for instance by hand.

It will be apparent that many variations of the above described preferred embodiments can be envisaged; the rights sought are defined by the scope of the following claims.

The invention claimed is:

1. A method comprising:
   placing sausages in respective holders to provide loaded holders;
   disposing a number of the loaded holders adjacently of each other; and
   inserting at least one of a stick and tube through the number of the loaded holders.

2. The method as claimed in claim 1, wherein placing the sausages comprises moving the sausages into the holders via a slide chute.

3. The method as claimed in claim 2, further comprising holding the sausages out of centers of the loaded holders using decentering means.

4. The method as claimed in claim 3, wherein the sausage decentering means comprise suction means substantially at the position of the top part of each of the holders.

5. The method as claimed in claim 4, wherein the suction means include an air pump.

6. The method as claimed in claim 2, wherein each of the loaded holders is provided with suction channels which draw the sausage against side walls of the loaded holder.

7. The method as claimed in claim 6, wherein the suction channels include an air pump.

8. The method as claimed in claim 1, further comprising carrying the loaded holders to a first conveyor belt where the loaded holders are disposed adjacently of each other up to the number.

9. The method as claimed in claim 1, further comprising carrying the number of loaded holders to a second conveyor belt, whereafter the stick or tube is placed through the loaded holders.

10. The method as claimed in claim 1, wherein each of the holders is provided with a slot for inserting at least one of the stick and tube therethrough.

* * * * *